April 26, 1949.　　　P. F. PEW　　　2,468,603
FILTER
Filed Oct. 22, 1945

INVENTOR.
Preston F Pew,
BY
ATTY

Patented Apr. 26, 1949

2,468,603

UNITED STATES PATENT OFFICE 2,468,603

FILTER

Preston F. Pew, Chicago, Ill., assignor to Infilco Incorporated, Chicago, Ill., a corporation of Delaware Application October 22, 1945, Serial No. 623,626

6 Claims. (Cl. 210—152)

This invention relates to filters of the type wherein an impure liquid is filtered through, and deposits impurities on, one or more permeable filter elements which are interposed in a filter casing between the inlet for liquid to be filtered and the outlet for filtered liquid. Such filter elements may be made of any suitable material and in any suitable form, such as ceramic or other porous tubes, wire screens with or without filter cloths, or they may be formed as described in Paterson et al. Patent No. 2,347,927, by winding wire in form of a helix having very small clearances between adjacent turns over an apertured metal sleeve or porous tube having external ribs. Such elements, whatever their specific form and material, are in most cases not used per se, but as support for a bed or cake of filter aid, such as diatomaceous earth, siliceous earth, kieselguhr and the like. However they can be, and in some cases are, used without filter aids and my invention is useful for both forms of filters. Therefore, while my invention will be described in connection with a filter utilizing a filter bed of diatomaceous earth or similar material, this is done for purposes of exemplification and illustration and my invention is not limited to such diatomite filters.

It is an object of my invention to provide an improved filter of the type utilizing permeable filter elements for filtration.

Another object of this invention is an improved diatomite or "bomb" filter.

Another object of the invention is to provide improved means for washing the filter elements of a diatomite filter.

In such diatomite, or "bomb" filters, as they are often called, the filter aid material is introduced into the filter, generally in suspension in the liquid to be filtered, through the inlet and deposits on the element in a layer or bed which is held against the element by the flow of liquid through the element. As filtering proceeds and impurities continue to be deposited on the filter bed, the interstices of the filter bed, and finally also the pores of the support become increasingly clogged. When the filtering rate falls below a predetermined value filtering is interrupted and the filter is cleansed.

Cleansing of this type of filters has generally been carried out by a reversal of flow, on the theory that the wash water would flow in reverse direction through the pores of the filter support, wash the cake off and clean the entire surface of the element. In practice however this method was not found satisfactory, because the wash water, instead of being forced out uniformly through the pores of the filter support and washing the entire surface of the element, would flow down the hollow core of the element and leave parts of the surface insufficiently washed. It has therefore been necessary to supplement this "backwash" by other means. Thus it has been proposed in the above mentioned patent to direct currents of wash water filmwise downwardly along the surface of the filter to wash the bed off and cleanse the supporting element. In most cases, however, it is necessary after a number of backwashing operations to resort to brushing of the elements or to remove the elements from the filter for more thorough cleaning.

More recently it has been proposed in Patent No. 2,423,172 to wash such diatomite filters by what has been called an "air bump wash." In this improved method of washing a body of air, compressed in what may be termed an "air impulse storage space" in the upper portion of the filter housing is used as motive power. A second body of air, compressed in what may be termed an "air release storage space" in an intermediate portion of the filter housing is utilized to suddenly release this motive power, which then forces the water in the filter with tremendous velocity back through the filter elements. The whole procedure is instantaneous, explosion like, the filter cake being washed off and the elements thoroughly and uniformly cleansed within a second or less. This method has been found in practice to be very efficient and saves also considerably in power and wash water, no water beyond the contents of the filter being needed.

My invention relates to a filter constructed for such air bump wash and it is a specific object of my invention to provide certain improvements over the apparatus heretofore used therefor and to further improve the efficiency of this method of washing.

It is another object of my invention to provide a filter equipped for air bump wash which is smaller and cheaper than apparatus heretofore used.

It is another object to provide a diatomite filter equipped for air bump wash wherein the air for release needs no extra storage space.

Another object is to provide a diatomite filter equipped for air bump wash wherein the entire length of the filter elements can be utilized for filtration.

Still another object is to provide a diatomite filter with air bump wash, wherein the wash water issuing from the filter elements is directed downwardly along the surface of the elements.

Other objects will become apparent upon consideration of the description and the claims which follow.

The exact nature of my invention will be understood with reference to the drawings.

Figure 1:
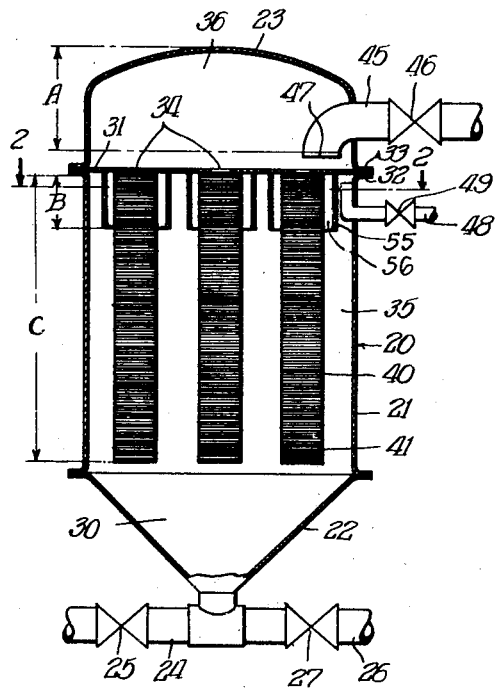
Figure 1 is a diagrammatic cross-sectional view showing the layout of a filter equipped for air bump wash according to my invention.
Figure 2:
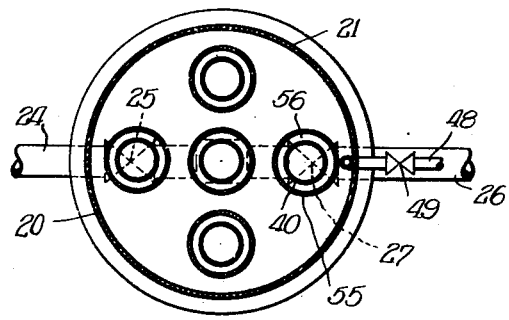
Figure 2 is a plan view of the filter shown in Figure 1 taken at the plane indicated by line 2—2 of Figure 1.

As shown in Figures 1 and 2, a diatomite filter equipped for air bump wash generally comprises a casing 20 of any convenient shape, but preferably and as shown in the drawings the casing 20 will have a circular boundary wall 21, a hopper bottom 22, and a cover 23. The cover 23 preferably is removable and may be fixed by any suitable means, not shown, to the wall, 21. An inlet for the liquid to be filtered, 24, equipped with a valve 25, opens into the bottom portion 30 of the housing 20, and a waste outlet, 26, equipped with a valve 27, leads also from the bottom portion 30, of the housing. Horizontally across the entire cross-sectional area of the casing 20 a dividing plate 31 extends which may be fastened by any suitable means to the wall 21, as by clamping its peripheral edge between the upper edge 32 of the wall 21 and the lower edge 33 of the cover 23. This dividing plate 31 divides the casing into two superposed separate chambers, 35 and 36, which are in communication with each other through one or more openings 34 in the plate 31.

Depending on the size of the plant one or more filter elements 40 of any suitable type will be provided in the lower or inlet chamber 35; while five are shown in the drawings, it will be obvious that more or less could be used and that they could be arranged in any suitable pattern. For purposes of illustration the elements 40 are shown as being formed by wire which is helically wound around a cage of foraminous material, such as plastic, in manner described in said patent to Paterson et al. Obviously other types of filter elements known in the art could be used. The lower end of the core 41 of the filter elements 40 is closed and the upper end of the core 41 is open, so that liquid filtering through the foraminous wall into the core 41 can rise therethrough. The filter elements are affixed to and supported by the dividing plate 31 with the upper open ends of the cores registering with the openings 34 in the dividing plate. The openings 34 will be of somewhat smaller diameter than the cores 41 and will correspond in number to the number of filter elements it is desired to use. Thus there is provided a constantly open passage through each filter element from the lower chamber 35 into the upper chamber 36.

An outlet conduit for filtered liquid 45, provided with a valve 46, leads from an intermediate level of the upper or outlet chamber 36. The elevation of the intake 47 of the outlet conduit 45 will be chosen so as to keep the intake 47 submerged in the liquid and to provide a sufficient air impulse storage space A for compressed air in the upper portion of the outlet chamber 36 for proper operation of the air bump wash. An air release storage space B is provided under the plate 31 by means to be described below. A vent or air release pipe, 48, provided with a quick acting valve 49 leads from an elevation in the lower chamber 35 immediately below the plate 31.

In the past, and as shown in the above mentioned Patent No. 2,423,172, the air release space was provided by making the upper portions of the cores of the filter elements of impervious material. Thereby air in the space below the dividing plate and above the pervious part of the core was prevented from escaping through the elements and the openings in the dividing plate and was trapped in the upper portion of the lower chamber and compressed during operation under inlet pressure, thus forming a body of air for release.

Obviously, with this construction of the air release space, the upper portion of the filter element cannot be used for filtering, as it has to be impervious. This necessitates using longer filter elements than would be needed for filtration alone. The materials, especially plastics now widely used for such elements, which are able to withstand the high operating pressures of these filters, are quite expensive and the greater length of the elements involves therefore considerable increase in cost beside that caused by requiring a larger tank. My invention has the object of avoiding this drawback while retaining all advantages of the air bump wash.

In my improved form of apparatus the filter elements 40 are pervious for their entire length, the core 41 being foraminous throughout, and wound with wire for their entire length. To provide an air release storage space B, I surround the upper pervious portion of each filter element 40 with a circular baffle or shield, 55, of impervious material. The baffles 55 are of somewhat larger diameter than the elements 40, are open at the bottom, affixed at their tops to the plate 31 and extend down therefrom to an elevation below the air release pipe 48. Thus air in the space outside of and between the shields 55 is prevented from escaping through the elements 40 and the openings 34 and will be trapped in the upper portion of the lower chamber 35 between the several shields 55 and the wall 21 of the housing, 20. Any air within the annular chambers 56 formed by the shields 55 around the elements 40, however, can escape through the passages formed by the elements 40 and the openings 34 into the upper chamber 36 thus permitting the liquid to rise to the top of these shield chambers 56 and filter through the full length of the filter elements 40.

The operation of the improved apparatus is the same as that of filters with conventional air bump wash. When starting a filter run, the outlet valve 46 for filtered liquid, the drain valve 27, as well as the air release valve 49 will be closed and the inlet valve 25 opened. The liquid will rise in the filter and fill inlet chamber 35, expelling air within the shields 55 into the outlet chamber 36 and trapping the air in air release space B, between the shields and the tank wall and compressing it below the plate 31 under inlet pressure. As the liquid continues to rise and enters the upper chamber 36 through the openings in the plate 31 it will push the air in that chamber into the air impulse storage space A in the upper part of the upper chamber and compress it there under inlet pressure. Thereafter, the valve 46 on the outlet for filtered liquid 45 is opened and filtering proceeds until the elements 40 become clogged and need washing. At this time both the inlet valve 25 and the outlet valve 46 will be closed and the air release valve 49 opened. Instantaneously the air compressed in air release space B between the shields 55 and the tank wall escapes through air release pipe 48, and the air compressed in air impulse storage space A expands, immediately forcing the liquid in the interior of the filter element 40 with considerable velocity outwardly through the interstices of the filter element, to completely remove the filtering medium therefrom. This air bump wash is completed within a second or less due to the sudden release of the power stored in the body of air compressed in the air impulse storage space A.

The use of my improved apparatus results in several advantages.

It permits the use of the full length of the filter element for filtering, thus providing an effective filter area C whose height corresponds to the length of the filter elements. In the conventional apparatus, as illustrated by Patent No. 2,423,172, the height of the effective filter area is only a part of the length of the filter element. By utilizing the full length of the elements as effective filtering area C, I can reduce the length of the elements for the full height of the air release storage space B provided in the conventional air bump wash, the space between my shields affording sufficient air release storage for proper operation of the air bump wash. It is obvious that my tank can also be proportionally smaller. For, as clearly shown in Figure 1, in my improved apparatus the air release space B is vertically coextensive with the upper portion of the effective filtering area C, whereas in the conventional construction the air release space is necessarily superposed over the effective filter area, thus necessitating additional height of the tank that cannot be used for filtering.

Beside this considerable saving I obtain by the introduction of my shields 55 the further advantage that the backwash flow issuing from the elements 40 is directed downwardly along the outside of the filter elements. The filter cake which is broken up by the high velocity outward flushing of the elements is thereby washed down into the bottom of the tank, the filter material thus being rapidly collected in the hopper bottom 22 of the housing 30 for resuspension in a new filter run or for flushing out through the drain 26. This is very desirable and obviates any need of additional water streams directed along the outside of the filter, such as provided in the patent mentioned above, the wash water itself taking their function.

While this latter feature is especially advantageous in connection with diatomite filters, my invention is not to be construed as limited to such filters, as it is also useful in connection with filters using porous elements without filter aid. It will also be understood that the invention is not limited to the exact construction shown and described, but that various changes may be made without departing from the spirit and scope of the invention. What is important is not the exact means disclosed, but the elimination of all extra space for the air release storage while retaining its function, thus obtaining all the advantages of the air bump wash of the prior art without its drawbacks.

I claim:

1. A diatomite filter comprising a closed casing, a plate dividing said casing into an inlet chamber and an outlet chamber, flow passages in said plate, an inlet for pressure liquid into the lower portion of said inlet chamber, an outlet for filtered liquid a substantial distance below the top portion of said outlet chamber, a plurality of permeable tubular filter elements in said inlet chamber registering with said flow passages, said elements being closed at the bottom and open at the top, and an impervious annular baffle of greater diameter than said openings surrounding the upper end of each element, said baffles being impermeably affixed to said plate, a vent leading from said casing at an elevation intermediate said plate and the lower ends of said baffles, and a waste outlet from the lower portion of said casing.

2. A filter comprising a closed housing, an inlet into the lower portion of said housing, a plate extending across said housing and dividing the space within said housing into two separated, superposed chambers, a constantly open passageway through said plate, a hollow filter element having a porous wall so positioned in said housing that the upper end of said element registers with said passageway, whereby liquid filtering through the porous wall of said filter element flows through said passageway into the upper chamber, a conduit leading from a lower level of said upper chamber to outside the housing, a valve on said conduit, a waste outlet from the lower chamber, a valve on said outlet, a vent leading from an upper level of said lower chamber, a valve on said vent, and baffle means surrounding the upper portion of said porous wall, said baffle means extending from said plate downwardly to below said vent.

3. In a diatomite filter comprising a closed casing, an inlet into the lower portion of said casing, a waste outlet from the lower portion of said casing, a dividing plate extending across said casing and dividing it into an upper and a lower chamber, a passageway through said plate, an outlet for filtered liquid leading from a lower elevation of said upper chamber, and a filter element having an annular permeable wall in said lower chamber, the upper rim of said permeable wall being affixed to said plate and surrounding said passageway, a baffle extending around the upper portion of said permeable wall and being affixed to said plate at its upper rim, whereby the space within said baffle is open to said upper chamber through said permeable wall and said passageway, and the space between said baffle and the wall of said casing is separated from said upper chamber by said plate and said baffle, and a vent leading from said casing at an elevation below said plate and above the lower end of said baffle.

4. In a filter comprising a housing having a cover, an inlet for liquid to be filtered discharging into the lower portion of said housing, a waste discharge from the lower portion of said housing, an outlet for filtered liquid leading from an upper portion of said housing at an elevation spaced substantially below said cover, a vent at an elevation intermediate said inlet and said outlet, a plate extending across the housing above said vent and below said outlet, an opening in said plate, and a filter element having a foraminous wall interposed across the opening in said plate, the combination with said filter element of an impervious annular wall structure affixed to said plate and extending downwardly therefrom to below said vent and forming an annular chamber around the upper end of said foraminous wall.

5. In a filter having a housing, an inlet into the lower portion of said housing, an outlet from the upper portion of said housing and a drain from the lower portion of said housing, an air space above said outlet, a plate extending horizontally across the housing below said outlet, an opening in said plate, and a filter element having a foraminous wall below said plate and registering with said opening, the combination with said filter element of an impermeable baffle surrounding the upper portion of said permeable wall and depending from said plate thereby forming a second air space immediately below said plate, and an air release leading from said second air space.

6. In combination with a filter of the type wherein liquid is filtered upwardly from an inlet in the lower portion of a filter casing through a permeable filter element and filtered liquid is withdrawn through an outlet above the filter element, an air chamber so constructed and arranged that air is trapped therein by liquid rising to the outlet, an impermeable plate extending across the entire cross-sectional area of the casing above the filter element and below the outlet, a constantly open passageway through said plate registering with the element, an impervious baffle affixed to said plate and surrounding the upper portion of said element and forming with said filter casing a second air chamber wherein air is trapped by liquid rising to said plate, said second air chamber being vertically coextensive with and laterally surrounding the permeable upper portion of said filter element, and means for releasing air from said second air chamber.

PRESTON F. PEW.

REFERENCES CITED

The following references are of record in the file of this patent:

UNITED STATES PATENTS

| Number | Name | Date |
| --- | --- | --- |
| 2,079,475 | Williams et al. | May 4, 1937 |
| 2,108,798 | Dalrymple | Feb. 22, 1938 |
| 2,230,174 | Beale | Jan. 28, 1941 |
| 2,347,927 | Paterson et al. | May 2, 1944 |
| 2,401,039 | Bauer | May 28, 1946 |
| 2,423,172 | Booth | July 1, 1947 |